United States Patent [19]

Rojstaczer

[11] Patent Number: 5,209,981
[45] Date of Patent: May 11, 1993

[54] POLYIMIDESILOXANE EXTENDED BLOCK COPOLYMERS

[75] Inventor: Sergio Rojstaczer, Amherst, N.Y.

[73] Assignee: Occidental Chemical Corporation, Niagara Falls, N.Y.

[21] Appl. No.: 714,532

[22] Filed: Jun. 13, 1991

[51] Int. Cl.$^5$ .............................. B32B 9/04
[52] U.S. Cl. ..................... 428/447; 525/431; 528/26; 528/38
[58] Field of Search ............ 528/26, 38; 428/447; 525/431

[56] References Cited

U.S. PATENT DOCUMENTS

| | | | |
|---|---|---|---|
| 4,558,110 | 12/1985 | Lee | 528/26 |
| 4,586,997 | 5/1986 | Lee | 525/426 |
| 4,829,131 | 5/1989 | Lee | 528/26 |
| 5,094,919 | 3/1992 | Yamada et al. | 528/26 |

Primary Examiner—John C. Bleutge
Assistant Examiner—D. Aylward

Attorney, Agent, or Firm—Wayne A. Jones; Richard D. Fuerle

[57] ABSTRACT

Disclosed is method of making a polyimidesiloxane extended block copolymer containing at least one polyimide block made by reacting a dianhydride with a diamine that does not contain a siloxane group, and at least one polyimidesiloxane block made by reacting a dianhydride with a diamine that contains at least one siloxane group, where each polyimidesiloxane block is prepared using more than one mole of the dianhydride for each mole of the siloxane-containing diamine. That is, any siloxane-imide blocks in the polyimidesiloxane are formed from amic acid blocks terminated in anhydride groups and any imide blocks in the polyimidesiloxane are formed from amic acid blocks terminated in amine groups. The polyimidesiloxane block copolymers have higher glass transition temperatures than the corresponding non-extended block copolymers while retaining the same solubility.

28 Claims, No Drawings

POLYIMIDESILOXANE EXTENDED BLOCK COPOLYMERS

BACKGROUND OF THE INVENTION

This invention relates to polyimidesiloxane extended block copolymers and methods of preparing them. In particular, it relates to such extended block copolymers wherein the siloxane-anhydride containing block is prepared using a controlled excess of dianhydride.

Polyimidesiloxanes are polymers made by reacting a dianhydride with a diamine, where either a mixture of siloxane-containing dianhydride and non-siloxane containing dianhydride, or a mixture of siloxane-containing diamine and non-siloxane containing diamine, is used. Polyimidesiloxanes are used in a variety of different applications, but are particularly useful as coatings and adhesives in the microelectronics industry Two properties of polyimidesiloxanes that are particularly important are glass transition temperature, $T_g$, and solubility. A high $T_g$ means that the polymer will not lose its physical or mechanical properties readily at higher temperatures. Good solubility is required in order to form a solution of the polymer so that coatings can be formed from it.

It is a general rule in polymer chemistry that block copolymers have a higher $T_g$ than do the corresponding random copolymers. However, normally increasing the block size will decrease the solubility. A polyimidesiloxane block copolymer is a polyimidesiloxane having two or more $T_g$'s. A polyimidesiloxane can display two $T_g$'s whenever the siloxane-containing diamine or dianhydride is large, even though the siloxane-containing monomer is randomly dispersed throughout the polymer.

SUMMARY OF THE INVENTION

We have discovered that polyimidesiloxane extended block copolymers can be prepared which have a higher $T_g$ than the corresponding non-extended copolymers, but are not less soluble. The unique block copolymers of this invention are made by reacting the siloxane diamine in the presence of a limited excess of dianhydride.

DESCRIPTION OF THE INVENTION

The extended block copolymers of this invention are prepared from three monomers—a dianhydride, a diamine that does not contain a siloxane group, and a siloxane-containing diamine. They are called "extended" block copolymers because the siloxane diamine is not randomly dispersed throughout the polymer with the non-siloxane-containing diamine, but at least two juxtaposed repeating units are made from the lower mole content diamine.

Any diamine can be used as the non-siloxane containing diamine in preparing the block copolymers of this invention. Aromatic diamines are preferred because they give polyimidesiloxanes having better thermal properties. Examples of suitable diamines include 2,4-diaminotoluene (TDA), 2,5-diaminotoluene, 2,6-diaminotoluene, m-xylyl diamine, 2,4-diamine-5-chlorotoluene, 2,4-diamine-6-chlorotoluene, 2,2-bis(4[4-aminophenoxyl]phenyl) propane (BAPP), trifluoromethyl-2-4-diaminobenzene, m-phenylenediamine, p-phenylenediamine, 2,2'-bis(4-aminophenyl)-hexafluoropropane (6F), 2,2-bis (4-phenoxy aniline) isopropylidene, trifluoromethyl-2,4-diaminobenzene, trifluoromethyl-3,5-diaminobenzene, 2,4,6-trimethyl-1,3-diaminobenzene, 3,4'-oxydianiline (ODA), 4,4'oxydianiline, m,m-methylene dianiline, m,m-sulfone dianiline, 4,4'-diamino-2,2'-trifluoromethyl diphenyloxide, 3,3'-diamino-5,5'-trifluoromethyl diphenyloxide, 4,4'-trifluoromethyl-2,2'-diamino biphenyl, 2,4,6-trimethyl-1,3-diaminobenzene, o,m-sulfone dianiline, and diaminoanthraquinone. Mixtures of diamines can be used. The preferred diamines are 6F, TDA, BAPP, and ODA because they are readily available and work well.

Any dianhydride can be used in preparing the block copolymers of this invention. Aromatic dianhydrides are preferred because they produce polyimides having better thermal properties. Examples of suitable aromatic dianhydrides include
1,2,5,6-naphthalene tetracarboxylic dianhydride;
1,4,5,8-naphthalene tetracarboxylic dianhydride;
2,3,6,7-naphthalene tetracarboxylic dianhydride;
2-(3',4'-dicarboxyphenyl) 5,6-dicarboxybenzimidazole dianhydride;
2-(3',4'-dicarboxyphenyl) 5,6-dicarboxybenzoxazole dianhydride;
2-(3',4'-dicarboxyphenyl) 5,6-dicarboxybenzothiazole dianhydride;
2,2',3,3'-benzophenone tetracarboxylic dianhydride;
2,3,3',4'-benzophenone tetracarboxylic dianhydride;
3,3',4,4'-benzophenone tetracarboxylic dianhydride (BTDA);
2,2',3,3'-biphenyl tetracarboxylic dianhydride;
2,3,3',4'-biphenyl tetracarboxylic dianhydride;
3,3',4,4'-biphenyl tetracarboxylic dianhydride (BPDA);
bicyclo-[2,2,2]-octen-(7)-2,3,5,6-tetracarboxylic-2,3:5,6-dianhydride;
bis (3,4-dicarboxyphenyl) sulfone dianhydride;
bis (3,4-dicarboxyphenyl) sulfoxide dianhydride;
bis (3'4'-dicarboxyphenyl oxadiazole-1,3,4) paraphenylene dianhydride;
bis (3,4'-dicarboxyphenyl) 2,5-oxadiazole-1,3,4 dianhydride;
bis 2,5-(3',4'-dicarboxydiphenylether) 1,3,4-oxadiazole dianhydride;
bis (3',4'-dicarboxydiphenylether) 2,5-oxadiazole 1,3,4 dianhydride;
bis (3,4-dicarboxyphenyl) ether dianhydride or oxydiphthalic anhydride (ODPA);
bis (3,4-dicarboxyphenyl) thioether dianhydride;
2,2'-bis (3,4-dicarboxyphenyl) hexafluoropropane dianhydride (6FDA);
bis (3,4-dicarboxyphenyl) propane dianhydride;
bis (3,4-dicarboxyphenyl) methane dianhydride;
cyclopentadienyl tetracarboxylic acid dianhydride;
cyclopentane tetracarboxylic dianhydride;
ethylene tetracarboxylic acid dianhydride;
perylene 3,4,9,10-tetracarboxylic dianhydride;
pyromellitic dianhydride (PMDA);
tetrahydrofuran tetracarboxylic dianhydride; and
5,5-[2,2,2-trifluoro-1-(trifluoromethyl)ethylidene] bis-1,3-isobenzofurandione).
The preferred dianhydrides are BTDA, ODPA, BPDA, and 6FDA because they are readily available and work well. Bisether and bissulfide dianhydrides, such as bisphenol A bisether dianhydride, bisphenol S bisether dianhydride, and hydroquinone bisether dianhydride, are preferably avoided because they give polymers having lower $T_g$'s.

The siloxane-containing diamine used in the preparation of the block copolymers of this invention is a diamine that contains at least one siloxane group

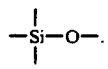

A description of siloxane diamines that can be used in this invention can be found in U.S. Pat. No. 4,829,131, herein incorporated by reference. Useful siloxane diamines have the general formula

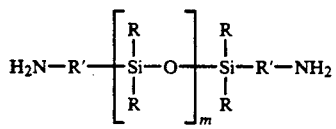

where each R is independently selected from a substituted or unsubstituted aliphatic mono-radical with 1 to 12 carbon atoms or a substituted or unsubstituted aromatic mono-radical with 6 to 10 carbon atoms, and m, the number of repeated siloxane groups, is 0 to 200 and is preferably 1 to 12. (The term "Gm" is used to indicate a siloxane diamine of m repeated units.) Suitable R radicals include $-CH_3$, $-CF_3$, $-(CH_2)_5CF_3$, $-CH=CH_2$, $-C_6H_5$, $-CF_2-CHF-CF_3$, and

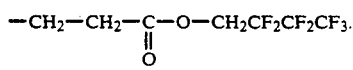

In the formula, R' has the same definition as R, but is a di-radical instead of a mono-radical. Examples of suitable R' groups include $-(CH_2)_s-$, $-(CF_2)_s-$, $-(CH_2)_s(CF_2)_t-$, and $-C_6H_4-$, where s and t are each independently selected from 1 to 10. An example of a suitable siloxane diamine is α,ω-bis 3-amino-propyl-polydimethylsiloxane

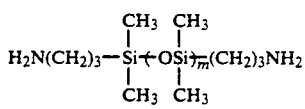

In addition, a solvent is required during preparation of the block copolymers. Any solvent that will dissolve the polyamic acid, and preferably will also dissolve the polyimide, can be used in this invention. Examples of solvents that may be suitable include N-vinyl pyrrolidone, acetone, benzene, Cellosolve acetate (hydroxyethyl acetate glycol mono-acetate), triethylamine (TEA), Cellosolve (glycol ethylether), diethylether, dichloromethane, dimethylformamide, dimethylacetamide (DMAC), ethyl alcohol, diglyme, triglyme, methylisobutylketone, methylethylketone, N-methyl-pyrrolidone (NMP), sulfolane, toluene, and xylene. The preferred solvent is NMP because it solubilizes more polyimides than the other solvents do and is believed to be of low toxicity. Sufficient solvent should be used to form a solution of about 10 to about 35 wt% solids. The concentration of solvent can be used to control the thickness of the film.

Preparation of Polyamic Acids

The polyamic acid can be prepared in one of three ways. In the first method of preparation the siloxane diamine is first reacted with the dianhydride to form siloxane-amic acid oligomers. Additional dianhydride and the non-siloxane-containing diamine are then reacted with the oligomers to form the polyamic acid. This method is preferred when the number of moles of siloxane-containing diamine is less than the number of moles of non-siloxane containing diamine because this ensures the complete reaction of the siloxane-containing diamine.

In the second method of preparation, the non-siloxane containing diamine is first reacted with some of the dianhydride to prepare amic acid oligomers. The remaining dianhydride and the siloxane-containing diamine are then reacted with the amic acid oligomers to prepare the polyamic acid. The second method of preparation is preferred when the number of moles of siloxane-containing diamine exceeds the number of moles of non-siloxane-containing diamine to ensure the complete reaction of the non-siloxane diamine.

Finally, in the third method of preparation, the amic acid oligomers and the siloxane-amic acid oligomers are separately prepared and are then reacted together. These reactions occur at room temperature in solution as is known in the art.

In all three methods of preparation the siloxanecontaining diamine is reacted with excess dianhydride (i.e., more than a 1:1 molar ratio of dianhydride to siloxane diamine) and the non-siloxane-containing diamine is reacted with insufficient dianhydride (i.e., less than a 1:1 molar ratio of dianhydride to non-siloxane diamine) so that any amic acid oligomers that are formed terminate in amine groups and any siloxane-amic acid oligomers that are formed terminate in anhydride groups. This means that there must be more than one mole of dianhydride present to react with the siloxane-containing diamine and less than one mole of dianhydride present to react with the non-siloxane diamine (of course, the total number of moles of diamine must be approximately equal to the total number of moles of dianhydride). Preferably, the number of moles of dianhydride that are present to react with the siloxane containing diamine is less than twice the number of moles of siloxane-containing diamine because, if more than twice the number of moles of dianhydride are present, no siloxane-amic acid oligomer will be formed. As the number of moles of dianhydride to moles of siloxane-containing diamine increases from 1 to 2 the length of the siloxane-amic acid oligomer falls from theoretically infinity to an oligomer formed from a single siloxane diamine and two dianhydrides.

About 5 to about 75 wt% of the total polymer weight should be siloxane diamine because if less than 5 wt% of siloxane diamine is present the copolymer will have a higher moisture absorption, be less soluble, and will have poorer electrical properties, and if more than 75 wt% of the copolymer is siloxane diamine, the copolymer will lose high temperature and mechanical properties. Preferably, about 20 to about 60 wt% of the polymer weight is siloxane diamine. About 5 to about 95 mole% of the total number of moles of diamine, is non-siloxane diamine for the same reasons. Preferably, the number of moles of non-siloxane diamine is about 20 to about 90 mole% of the total number of moles of diamine. Another way of stating these proportions is that in the first method of preparation an amic acid siloxane oligomer is formed by reacting the dianhydride with the siloxane-containing diamine at a dianhydride to diamine molar ratio of x, where $1<x<2$ and then the amic acid siloxane block copolymer is formed by reacting the oligomer with y moles of dianhydride and z moles of non-siloxane containing diamine where $x + y = 1 + z$, the weight of the siloxane containing diamine is about 5 to about 75 wt% of the weight of the copolymer, and z is about 5 to about 95% of $z + 1$.

The novel polyamic acid siloxane extended block copolymers of this invention have the general formula

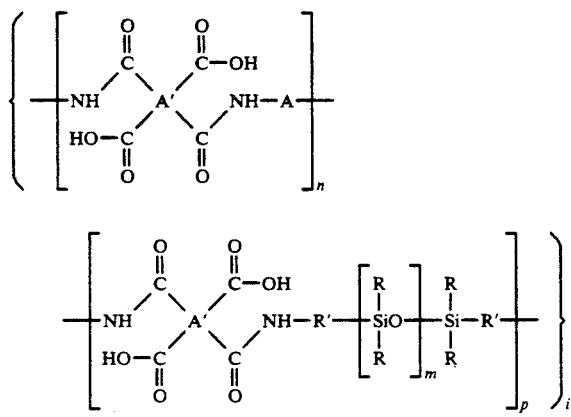

where A is an aromatic radical, each A' is independently selected from an aromatic radical that does not contain a bisether or bissulfide group, each R is independently selected from a substituted or unsubstituted aliphatic mono-radical of 1 to 12 carbon atoms or a substituted or unsubstituted aromatic mono-radical of 6 to 10 carbon atoms, R' has the same definition as R, but is a di-radical instead of a mono-radical, n, the average number of amic acid repeat units in the amic acid block, is 1.5 to 20 and p, the average number of siloxane-amic acid repeat units in the siloxane-amic acid block, is 1.5 to 20. The copolymers generally have a weight average molecular weight of about 5,000 to about 100,000. The novel polyimidesiloxane extended block copolymers of this invention have the same formula, but with the imide rings closed.

Polyimidesiloxane Coatings

A coating of a polyamic acid extended block copolymer according to this invention on a substrate can be made by spreading a solution of the polyamic acid on a substrate and evaporating the solvent. The polyamic acid can then be imidized to form a polyimidesiloxane extended block copolymer by heating to a temperature of about 120° C. for about 45 minutes followed by a temperature of about 250° C. for about 30 minutes.

Alternatively, if the polyimidesiloxane is soluble in the solvent, the solution of the polyamic acid can be imidized first to form a solution of the polyimidesiloxane and the solution can be spread on the substrate and the solvent evaporated to form a coating of the polyimidesiloxane on the substrate. Coatings can be formed on almost any type of substrate including silicon chips, plastics, metals, ceramics, and glasses.

The following examples further illustrate this invention:

EXAMPLE 1—(Comparative)

A poly(siloxane-amic acid) was prepared by adding 2.28 g of BTDA to a 100 ml. flask with 16 ml NMP. After the BTDA had dissolved, 1.0 g G$_9$ (Mw=867) was added. The mixture was reacted for 2 hours, at which point 0.72 g of TDA was added and the mixture was reacted for 16 hours. A film of the polyimidesiloxane was obtained by casting the poly(amic acid) precursor on a glass plate and curing for 45 minutes at 120° C. followed by 250° C. for 30 minutes. This polyimidesiloxane was a random copolymer.

EXAMPLE 2

An extended block poly(siloxane-amic acid) was prepared by adding 0.57g of BTDA to a 100 ml. flask with 16 ml. NMP. After the BTDA had dissolved, 1.2 grams G$_9$ were added. The mixture was reacted for 2 hours, at which point an additional 1.71 g of BTDA were added, followed by the addition of 0.65 g of TDA. The mixture was reacted for 16 hours. A film of the polyimidesiloxane block copolymer was obtained by casting the poly(amic acid) precursor on a glass plate and curing for 45 minutes at 120° C. followed by 250° C. for 30 minutes.

EXAMPLE 3 (Comparative)

Example 1 was repeated using 2.26 g BTDA, 1.0 g G$_{12}$ (Mw=1087), and 0.74 g TDA.

EXAMPLE 4 (Comparative)

Example 1 was repeated using 2.03 g BTDA, 1.4 g G$_9$, and 0.57 g TDA.

EXAMPLE 5

Example 2 was repeated using 0.76 g BTDA, 1.4 g G$_9$, 1.27 g BTDA, and 0.57 g TDA.

EXAMPLE 6 (Comoarative)

Example 1 was repeated using 2.18 g ODPA, 1.24 g G$_5$ (Mw=545), and 0.58 g TDA.

EXAMPLE 7

Example 2 was repeated using 1.09 g ODPA, 1.24 g G$_5$, 1.09 g ODPA, and 0.58 g TDA.

EXAMPLE 8 (Comoarative)

Example 1 was repeated using 1.93 g ODPA, 1.52 g G$_9$, and 0.55 g TDA.

EXAMPLE 9 (Comoarative)

Example 1 was repeated using 1.36 g ODPA, 1.60 g G$_9$, and 1.60 g BAPP.

EXAMPLE 10

Example 2 was repeated using 0.85 g ODPA, 1.24 g G$_9$, 0.51 g ODPA, and 1.68 g BAPP.

| Example # | Siloxane wt % | Siloxane Mw | $T_g$ (°C.) | Solubility in NMP | Solubility in Diglyme |
|---|---|---|---|---|---|
| 1C | 25 | 867 | 230 | p | i |
| 2 | 25 | 867 | 265 | p | i |
| 3C | 25 | 1087 | 269 | i | i |
| 4C | 35 | 867 | 205 | s | s |
| 5 | 35 | 867 | 230 | s | s |
| 6C | 30 | 543 | 150 | s | p |
| 7 | 30 | 543 | 160 | s | p |
| 8C | 38 | 867 | 171 | s | i |
| 9C | 40 | 867 | 130 | s | s |
| 10 | 40 | 867 | 142 | s | s |

C = Comparative example
s = soluble; p = partially soluble; i = insoluble

| Example # | Siloxane wt % | Siloxane Mw | $T_g$ (°C.) | Solubility in NMP | Solubility in Diglyme |
|---|---|---|---|---|---|
| 1C | 25 | 867 | 230 | p | i |
| 2 | 25 | 867 | 265 | p | i |
| 3C | 25 | 1087 | 269 | i | i |
| 4C | 35 | 867 | 205 | s | s |
| 5 | 35 | 867 | 230 | s | s |
| 6C | 30 | 543 | 150 | s | p |
| 7 | 30 | 543 | 160 | s | p |
| 8C | 38 | 867 | 171 | s | i |
| 9C | 40 | 867 | 130 | s | s |
| 10 | 40 | 867 | 142 | s | s |

C = Comparative example
s = soluble; p = partially soluble; i = insoluble

Examples 2, 5, 7, and 10 are extended block copolymers within the scope of the invention and Examples 1, 3, 4, 6, 8, and 9 are random copolymers which are not within the scope of the invention. Example 2 has improved $T_g$ versus comparative Example 1 without a loss of solubility, as in comparative Example 3. Similarly, Example 5 has improved $T_g$ versus comparative Example 4, again without a loss of solubility. Example 7 has improved $T_g$ versus comparative Example 6, without detriment to solubility, as in comparative Example 8. Example 10 has improved $T_g$ versus comparative Example 9, and yet is still as soluble.

Examples 3C and 8C demonstrate that the known method using higher molecular weight siloxane-diamine leads to higher $T_g$, however, this method involves a decrease in solubility unlike the case of extended block copolymers of the invention, which show enhanced $T_g$ while the solubility is the same as the non-extended block copolymer of lower $T_g$.

I claim:

1. In a method of making a polyimidesiloxane extended block copolymer from a polyamic acid-siloxane extended block copolymer that contains at least one amic acid block made by reacting a dianhydride with a diamine that does not contain a siloxane group, and at least one siloxane-amic acid block made by reacting a dianhydride with a diamine that contains at least one siloxane group, the improvement which comprises (A) preparing, in any order,
  (1) at least one siloxane-amic acid block by reacting a dianhydride with a diamine that contains at least one siloxane group, where the molar ratio of dianhydride present to said diamine is more than 1 and less than 2, so that no unreacted dianhydride is present and said siloxane-amic acid block is anhydride terminated; and
  (2) at least one amic acid block by reacting a diamine that does not contain a siloxane group with a dianhydride, where the molar ratio of dianhydride present ot said diamine that does not contain a siloxane group is less than 1, so that said amic acid block is amine terminated, where either said siloxane amic acid block or said amic acid block or both are prepared in the absence of dianhydride and diamine used to prepare the other block, and where the total number of moles of dianhydride is approximately equal to the total number of moles of diamine; and (B) imidizing amic acid groups.

2. A polyamic acid-siloxane extended block copolymer made according to the method of claim 1.

3. The method of claim 1 wherein said siloxane-containing diamine is reacted first with said dianhydride to form said siloxane-amic acid blocks, and said non-siloxane containing diamine and additional dianhydride is reacted with said siloxane-amic acid blocks.

4. The method of claim 1 wherein said non-siloxane-containing diamine is reacted first with said dianhydride to form amic acid blocks, and said siloxane-containing diamine and additional dianhydride is reacted with said amic acid blocks.

5. The method of claim 1 wherein said siloxane-containing diamine is reacted with said dianhydride to form said siloxane-amic acid blocks, and said non-siloxane containing diamine is separately reacted with said dianhydride to form said amic acid blocks, and said siloxane-amic acid blocks are reacted with said amic acid blocks.

6. The improvement of claim 1 wherein said dianhydride is aromatic.

7. The mprovement of claim 6 wherein said dianhydride is selected from the group consisting of pyromellitic dianhydride, 3,3',4,4'-biphenyl tetracarboxylic dianhydride, 3,3',4,4'-benzophenone tetracarboxylic dianhydride, oxydiphthalic anhydride, 2,2'-bis (3,4-dicarboxyphenyl) hexafluoropropane dianhydride, and mixtures thereof.

8. The improvement of claim 1 wherein said non-siloxane containing diamine is aromatic.

9. The improvement of claim 8 wherein said non-siloxane containing diamine is selected from the group consisting of 2,2-bis(4-aminophenyl)-hexafluoropropane, 2,4-diaminotoluene, 2,2-bis' (4[4-aminophenoxyl]-phenyl) propane, 3,4'-oxydianiline, and mixtures thereof.

10. The method of claim 8 wherein said siloxane diamine has the general formula

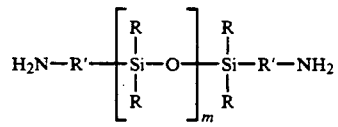

where each R is independently selected from a substituted or unsubstituted aliphatic mono-radical with 1 to 12 carbon atoms or a substituted or unsubstituted aromatic mono-radical with 6 to 10 carbon atoms, each R' is independently selected from a substituted or unsubstituted aliphatic di-radical with 1 to 12 carbon atoms or a substituted or unsubstituted aromatic di-radical with 6 to 10 carbon atoms, and m is 0 to 200.

11. The method of claim 10 wherein m is 1 to 12.

12. The method of claim 1 wherein said siloxane-containing diamine is about 5 to about 75 wt% of said polyimidesiloxane weight.

13. The method of claim 12 wherein said siloxane-containing diamine is about 20 to about 60 wt% of said polyimidesiloxane weight.

14. The method of claim 1 wherein said non-siloxane containing diamine is about 5 to about 95 mole% of the total number of moles of diamine.

15. The method of claim 14 wherein said non-siloxane containing diamine is about 20 to about 90 mole% of the total number of moles of diamine.

16. The method of claim 1 wherein said polyimidesiloxane has a $T_g$ over 100° C. and is soluble in N-methyl pyrrolidone.

17. A polyimidesiloxane block copolymer mande according to the method of claim 1.

18. A method of amking a polyamic acid-siloxane extended block copolymer comprising
(A) forming an amic acid-siloxane oligomer by reacting dianhydride with siloxane-containing diamine at a dianhydride to diamine molar ratio of x, where $1 < x < 2$; and
(B) reacting additional dianhydride and a non-siloxane containing diamine with said oligomer, where y is the number of moles of said additional dianhydride and z is the number of moles of said non-siloxane containing diamine, and $x+y<1+z$, the weight of said siloxane-contianing diamine is about 5 to about 75 wt% of the weight of said copolymer, and z is about 5 to about 95% of $z + 1$.

19. A method of amking a polyimidesiloxane extended block copolymer comprising imidizing a polyamic acid-siloxane block copolymer prepared according to the method of claim 18.

20. A polyimidesiloxane extended block copolymer made according to the method of claim 19.

21. A polyamic acid-siloxane extended block copolymer having the general formula

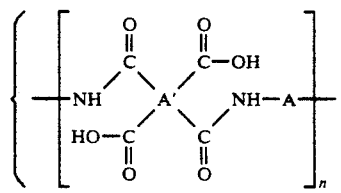

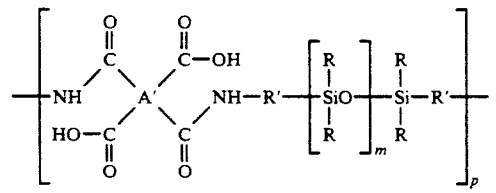

where A is an aromatic radical tht does not contain a siloxane group, each A' is independently selected from an aromatic radical that contains no bisether or bissulfide group, each R is independently selected from a substituted or unsubstituted aliphatic mono-radical of 1 to 12 carbon atoms or a substituted or unsubstituted aromatic mono-radical of 6 to 10 carbon atoms, each R' is independently selected from a substituted or unsubstituted aliphatic di-radical of 1 to 12 carbon atoms or a substituted or unsubstituted aromatic di-radical of 6 to 10 carbon atoms, n is 1.5 to 20, p is 1.5 to 20, and m is 0 to 200.

22. A polyamic acid siloxane extended block copolymer according to claim 21 having a weight average molecular weight of about 5,000 to about 100,000.

23. A method of making a polyimidesiloxane extended block copolymer comprising imidizing an amic acid-siloxane extended block copolymer according to claim 21.

24. A method of forming a coating on a substrate of a polyimidesiloxane extended block copolymer comprising forming a solution in a solvent of a polyamic acid-siloxane extended block copolymer according to claim 21, spreading said solution on a substrate, evaporating said solvent, and imidizing said copolymer.

25. A coated substrate made according to the method of claim 24.

26. A polyamic siloxane extended block copolymer having the general formula

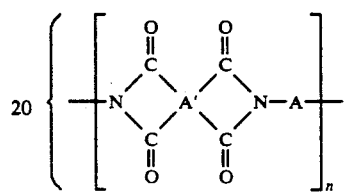

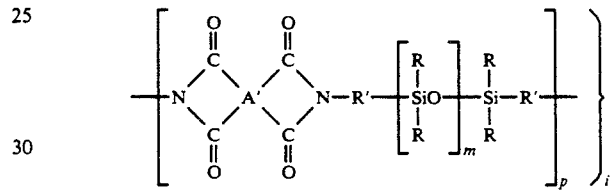

where A is an aromatic radical that does not contain a siloxane gruop, each A' is independently selected from an aromatic radical that contains no bisether or bissulfide group, each R is independently selected from a substituted or unsubstituted aliphatic mono-radical of 1 to 12 carbon atoms or a substituted or unsubstituted aromatic mono-radical of 6 to 10 carbon atoms, each R' is independently selected from a substituted or unsubstituted aliphatic di-radical of 1 to 12 carbon atoms or a substituted or unsubstituted aromatic di-radical of 6 to 10 carbon atoms, n is 1.5 to 20, p is 1.5 to 20, m is 0 to 200, and the proportion of said amic acid blocks to said siloxane blocks is about 0.05 to about 20.

27. A polyamide siloxane extended block copolymer according to claim 26 having a weight average molecular weight of about 5,000 to about 100,000.

28. A method of forming a coating on a substrate of a polyimidesiloxane block copolymer comprising forming a solution in a solvent of a polyimidesiloxane extended block copolymer according to claim 26, spreading said solution on a substrate, and evaporating said solvent.

* * * * *